United States Patent
Robins

[15] 3,676,392
[45] July 11, 1972

[54] RESIN COMPOSITIONS

[72] Inventor: Janis Robins, St. Paul, Minn.
[73] Assignee: Ashland Oil Inc., Houston, Tex.
[22] Filed: Jan. 26, 1971
[21] Appl. No.: 109,944

Related U.S. Application Data

[63] Continuation-in-part of Ser. No. 72,113, Sept. 14, 1970, and a continuation-in-part of Ser. No. 723,873, April 24, 1968, abandoned, and a continuation-in-part of Ser. No. 569,106, Aug. 1, 1966, Pat. No. 3,429,848, and a continuation-in-part of Ser. No. 536,180, March 14, 1966, Pat. No. 3,485,797.

[52] U.S. Cl. ..........................260/38, 260/59, 260/DIG. 40
[51] Int. Cl. ...............................................................C08g 5/06
[58] Field of Search..................260/38, 59, DIG. 40; 164/43

[56] References Cited

UNITED STATES PATENTS 3,409,579  11/1968  Robins..................................260/30.4
2,374,136  4/1945   Rothrock..............................260/59 X
3,428,110  2/1969   Walker et al.....................260/DIG. 40

OTHER PUBLICATIONS

R. W. Lenz, Organic Chemistry of Synthetic High Polymers (1967) Interscience, QD281.P614, pp. 181–182.
International Encyclopedia of Chemical Science, D. Van Nostrand Co. (1964) QD515, p. 167.
B. A. Dombron, Polyurethanes (2nd ed.), Reinhold, (1965), QD35.A2D6, p. 21.
R. T. Morrison and R. N. Boyd, Organic Chemistry (1959), pages 287–292.
W. Cooper et al., " Isocyanate Reactions and the Structure of Polyurethanes" in Industrial Chemist, v. 36, No. 421 (March, 1960), pages 121–126.

*Primary Examiner*—Lewis T. Jacobs
*Assistant Examiner*—S. M. Person
*Attorney*—Walter H. Schneider

[57] ABSTRACT

Novel resin compositions comprising mixture of organic solvent soluble phenolic resin containing benzylic ether linkage and/or methylol end group with polyisocyanate and catalytic concentrations of a base. The resin compositions are capable of curing at room temperature and are useful as coating and binder compositions.

17 Claims, No Drawings

RESIN COMPOSITIONS

RELATED APPLICATIONS

This application is a continuation in part of the following prior applications: Ser. No. 72,113 filed Sept. 14, 1970; Ser. No. 723,873 filed Apr. 24, 1968, now abandoned; Ser. No. 569,106, filed Aug. 1, 1966, now U.S. Pat. No. 3,429,848 issued Feb. 25, 1969; and Ser. No. 536,180, filed Mar. 14, 1966 now U.S. Pat. No. 3,485,797 issued Dec. 23, 1969.

The present invention relates to resin compositions which are mixtures of certain phenolic resins and polyisocyanates. In another aspect the present invention relates to curable binder compositions which are useful in binding particulate solids such as aggregates. In still another aspect, the present invention relates to combinations of a foundry aggregate, such as sand, and a binder based on certain phenolic resins and polyisocyanates which, on being formed into a coherent mass with the aggregate, is capable of being cured at room temperature.

Foundry cores are prepared from mixtures of aggregate material, such as sand, which has been combined with a binding amount of a polymerizable or curable binder. Frequently, minor amounts of other materials are also included in these mixtures, e.g., iron oxide, ground flax fibers, and the like. The binder permits such a foundry mix to be molded or shaped into the desired form and thereafter cured to form a self-supporting structure.

Typically, sand is used as the aggregate material. After the sand and binder have been mixed, the resulting foundry sand mix is rammed, blown, or otherwise introduced into a pattern, thereby assuming the shape defined by the adjacent surfaces of the pattern. Then by use of catalysts, e.g., chlorine and carbon dioxide, and/or the use of heat, the polymerizable binder is caused to polymerize, thereby converting the formed, uncured foundry sand mix into a hard, solid, cured state. This hardening can be accomplished in the original pattern, in a gassing chamber, or in the holding pattern. See U.S. Pat. Nos. 3,145,438 and 3,121,268, which patents are illustrative of the prior art techniques.

Phenolic resins constitute one of the well-known classes of curable resin compositions used as binders in the foundry art. Both the novolac type of phenol-aldehyde resin and the "resole" or "A-stage" resins have been used in this type of application. Novolac resins are soluble, fusible resins in which the polymer chains have phenolic end-groups. They are traditionally prepared by condensing phenols with aldehydes using acid catalysts and employing a molar excess of phenol over aldehyde. Novolac resins can be cured to insoluble, infusible products by the addition of a source of formaldehyde such as hexamethylenetetramine or paraform. Resole and resitole resins, the latter being the more highly polymerized form of a resole resin, are generally prepared using an alkaline catalyst with excess aldehyde and result in polymers having a highly branched structure and therefore a high concentration of alkylol end-groups. Since each alkylol group constitutes a potential cross-linking site, the resole and resitole resins are readily converted to the cross-linked infusible polymer by heating. The most commonly used monomers are phenol, i.e., hydroxybenzene and formaldehyde for both the resole type and the novolac type of resin. Although both the novolac resins and the resole resins have advantages and disadvantages characteristic of their different polymer structure in their known application as foundry binders, both have been subject to the deficiency of requiring heat in order to achieve the cured foundry form. Frequently, it is necessary to keep the green cores in the original molds or patterns during this heating period since many heat-curable binders do not impart sufficient green strength to cause green cores to retain their desired shapes without external support until such time as a final cure can be effected.

The deficiencies of either novolac or resole resins to cure at room temperature are similarly exhibited in other areas in which novolac or resole resins find utility. Such areas include in particular molding compositions in which the phenolic resin is admixed with inert organic and inorganic fillers, coating compositions and adhesive compositions.

It is therefore an object of the present invention to provide novel resin compositions, capable of curing without heating.

It is another object to provide novel resin compositions based on mixtures of certain types of phenolic resins and isocyanates.

It is a further object to provide binder compositions based on certain types of phenolic resins, in admixture with polyisocyanates and base catalysts.

It is yet another object to provide binder compositions particularly suitable for the binding of particulate solids.

Still a further object of the present invention is to provide novel foundry products based on the novel resin compositions of the present invention.

It is still another object of the present invention to provide a process for producing cores and other foundry shapes from foundry mixes incorporating the novel resin compositions of the present invention.

Yet another object of the present invention is to provide cold-curable phenolic resin compositions which combine long bench life with fast curing times and superior bond strength properties.

Other objects will become apparent from the following description and claims.

Broadly described, the binder compositions of the present invention comprise organic solvent phenolic resins containing benzylic ether structure and/or methylol end group in non-aqueous systems which have been combined with sufficient polyisocyanate to cross-link the phenolic resin and which contain as the curing catalyst a base having a $pK_b$ value in the range of about 7 to about 11, as determined in a known manner, as described below.

The determination of $pK_b$ values of organic compounds may be made in various conventional manners depending upon the nature of the particular organic compound. The $pK_b$ values of compounds useful as catalysts in this invention may be determined according to methods described by D.D. Perrin in Dissociation Constants of Organic Bases in Aqueous Solution (Butterworths, London 1965).

Although it has been known heretofore that isocyanates react with phenolic resins to result in cross-linked materials, heating has generally been found to be necessary to result in cross-linked materials having acceptable properties. This has been particularly true where such mixtures of phenolic resins and polyisocyanates are employed in combination with a particulate solid such as a foundry aggregate. In the absence of heating the shaped aggregates have low tensile strength and are also deficient in other mechanical properties. These deficiencies are overcome by the compositions of the present invention which combine the use of a particular type of phenolic resin and a particular base catalyst.

In addition to the catalytic activity of causing curing at room temperature the base catalysts of the present invention add a highly surprising and desirable property to the resin compositions. Most cold-curable resin compositions combine long bench life with long cure times or short cure times with short bench lives. The resin compositions of the present invention for reasons not clearly understood combine long bench life with short cure times which result in superior mechanical properties in the cured product.

The resin compositions of the present invention are generally made available as a two-package system comprising the phenolic resin component in one package and the polyisocyanate hardener component in the other package, both components being in liquid form and therefore generally comprising organic solvent solutions. In general the catalyst is incorporated into the resin component although such is not essential. At the time of use, the contents of the two packages are combined and used in the intended application. In foundry applications it is furthermore feasible to first admix one component with the foundry aggregate such a sand and thereafter add the second component and admix it with the resulting mixture. After a uniform distribution of the binder on such as the sand particles in the foundry application has been obtained, the resulting foundry mix is molded into the desired shape. The shaped product can be immediately removed from the mold and on standing at room temperature will form a cured product. The time required for curing will vary with the nature of the base catalyst and more particularly with $pK_b$ value of the catalyst. Although the resin compositions of the present invention are particularly designed to achieve curing at room temperature it is to be understood that these resin compositions can also be cured by baking at elevated temperatures.

The benzylic ether resins which comprise one species of the phenolic resins employed in the present invention are characterized by containing a unit having the formula:

(I) 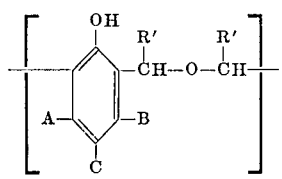

wherein A, B, and C are hydrogen, hydrocarbon radicals, oxyhydrocarbon radicals or halogen, the R's are individually H or hydrocarbon radical of one to eight carbon atoms and which have average degrees of polymerization, as measured by the number of repeating aromatic rings, of generally 3 to 100 and preferably 4 to 10. Although higher molecular weight resins are operable in the curing reactions above described such resins are difficult to handle from the standpoint of viscosity in requiring excessive amounts of solvents to bring the viscosity of the resin component to a level normally desired in coating and binder applications.

The described benzylic ether resins are condensation polymers of a phenol having the general formula:

(II) 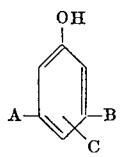

wherein A, B and C are hydrogen, hydrocarbon radicals, oxyhydrocarbon radicals, or halogen, with an aldehyde having the general formula R'CHO wherein R' is a hydrogen or a hydrocarbon radical of one to eight carbon atoms, prepared in the liquid phase in the substantial absence of water at temperatures below about 130° C in the presence of catalytic concentrations of a metal ion dissolved in the reaction medium. The molar ratio of aldehyde to phenol can generally be varied from 3:1 to 1:1, although some resin is also formed outside these ratios. The preparation and characterization of these resins is disclosed in greater detail in copending application Ser. No. 536,180, filed Mar. 14, 1966 now U.S. Pat. No. 3,485,797 issued Dec. 23, 1969. In the preferred form, these resins have the general formula:

(III) 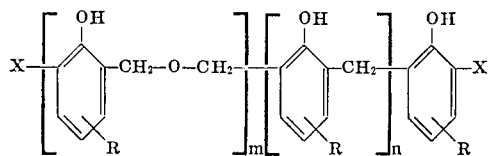

wherein R is a hydrogen or a phenolic substituent meta to the phenolic hydroxyl group, the sum of m and n is at least 2, X is an end-group from the group consisting of hydrogen and methylol, and wherein m is at least 1 and the sum of m and the number of methylol end-groups is at least 2.

The most preferred benzylic ether resins employed in the resin compositions of the present invention are those in which R is hydrogen.

The phenols employed in the formation of the benzylic ether resins are generally all phenols which have heretofore been employed in the formation of phenolic resins generally, and which are not substituted at either of the carbon atoms ortho to the hydroxyl group. Any one, all, or none of the remaining carbon atoms of the phenol ring can be substituted. The nature of the substituent can vary widely and it is only necessary that the substituent not interfere in the polymerization of the aldehyde with the phenol at the ortho-position. Substituted phenols employed in the formation of the phenolic resins include: alkyl substituted phenols, aryl-substituted phenols, cycloalkyl-substituted phenols, alkenyl-substituted phenols, alkoxy-substituted phenols, aryloxy-substituted phenols, and halogen-substituted phenols, the foregoing substituents containing from one to 26 and preferably from one to six carbon atoms. Specific examples of suitable phenols, aside from the preferred unsubstituted phenol, include: m-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of one to eight carbon atoms. The most preferred aldehyde is formaldehyde.

The methylol-terminated phenolic resins useful in the present invention are resole resins which are organic solvent soluble. The organic solvent soluble resole resins are a well established class of resins the preparation of which is known. However, since the resole resins having a high proportion of ortho-ortho methylene linkages are generally the organic solvent soluble resole resins, the majority of the resole resins useful in this invention are prepared from alkyl-substituted phenols wherein the para position is substituted. On the other hand, organic solvent soluble resole resins may also be prepared from phenols unsubstituted in the ortho and para positions by first preparing an ortho-ortho novolac and then reacting the novolac with further formaldehyde under milder conditions to product a methylol-terminated resin which is an organic solvent soluble resole resin unsubstituted at the para positions. As an illustration of this procedure, a mixture of phenol and formaldehyde wherein the molar ratio of phenol to formaldehyde is greater than 1:1 may be condensed in the presence of an ortho-ortho directing catalyst, such as sodium hydroxide, under alkaline pH, e.g. between 5 and 6, and at a temperature in the neighborhood of 160° C. When essentially no free formaldehyde remains, the excess phenol is removed by vacuum distillation and the resin cooled to the neighborhood of 40° C or 50° C. Additional formaldehyde is then added and the subsequent exothermic reaction controlled to keep the temperature below about 95° C. This mixture is then rapidly cooled before the resin becomes insoluble, which results in a methol-terminated organic solvent soluble resole resin having essentially no para substitution and being useful in this invention. The disclosures of British Pat. Nos. 773,510 and 773,547 are particularly pertinent to the above resole resins prepared from phenol unsubstituted in the meta and para positions.

The phenolic resin component is generally employed as a solution in an organic solvent although it is also feasible to employ the low molecular weight liquid resins without dilution. The desirability and effect of solvents will subsequently be described in greater detail. The optimum solvent concentrations for the phenolic resins will vary depending on the type of resins employed and its molecular weight. In general, the solvent concentration will be in the range of up to 80% by weight of the resin solution and preferably in the range of 20 to 80 percent. It is preferred to keep the viscosity of the resin component at less than X–1 on the Gardner-Holt Scale.

The catalyst employed in the compositions of the present invention is a base having a $pK_b$ value in the range of about 7 to about 11. The $pK_b$ value is the negative logarithm of the dissociation constant of the base and is a well-known measure of the basicity of a basic material. The higher this number is, the weaker the base. The bases falling within this range are generally organic compounds containing one or more nitrogen atoms. Preferred materials are heterocyclic compounds containing at least one nitrogen atom in the ring structure. Specific examples of bases which have $pK_b$ values within the necessary range include 4-alkyl pyridines wherein the alkyl group has from one to four carbon atoms, isoquinoline, arylpyridines such as phenyl pyridine, pyridine, acridine, 2-methoxypyridine, pyridazine, 3-chloro pyridine, quinoline, N-methyl imidazole, 4,4-dipyridine, phenyl-propyl pyridine, 1-methylbenzimidazole, and 1,4-thiazine.

In view of the varying catalytic activity and varying catalytic effect desired, catalyst concentrations will vary widely. In general the lower the $pK_b$ value is, the shorter will be the bench life of the composition and the faster, more complete will be the cure. Solvents and any acidity present in added ingredients such as sand may affect the catalytic activity. In general, however, catalyst concentrations will range from 0.01 to 10 percent by weight of the phenolic resin.

The second component or package of the novel binder composition comprises an aliphatic, cycloaliphatic, or aromatic polyisocyanate having preferably from two to five iso-cyanate groups. If desired, mixtures of polyisocyanates can be employed. Less preferably, isocyanate prepolymers formed by reacting excess polyisocyanate with a polyhydric alcohol, e.g. a prepolymer of toluene diisocyanate and ethylene glycol, can be employed. Suitable polyiso-cyanates include the aliphatic polyisocyanates such as hexamethylene diisocyanate, alicyclic polyisocyanates such as 4,4'dicyclohexylmethane diisocyanate, and aromatic polyisocyantes such as 3,4- and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenol isocyanates, chlorophenylene-2,4-diisocyanate, and the like. Although all polyisocyanates react with the described phenolic resin to form a cross-linked polymer structure, the preferred polyisocyanates are aromatic polyisocyanates and particularly diphenylmethane diisocyanate, triphenylmethane triisocyanate, complex commercially-available compositions containing polymeric isocyanates sold under such trademarks as "PAPI," "Mondur MR" and "NCO–120," and mixtures thereof.

The polyisocyanate is employed in sufficient concentrations to cause the curing of the phenolic resin and other active hydrogen-containing materials when present. This refers to materials with hydrogen atoms which display activity according to the well-known Zerewitinoff method as described by Kohlen in JACS, 49, 3181 (1927). Thus, for example, phenolformaldehyde resins of the Novolac and/or resole types having an average of two or more active hydrogen atoms per molecule may be employed. For information on Novolacs and resoles the disclosures of U.S. Pat. Nos. 3,242,107 and 3,409,571 and British Pat. No. 757,392 are hereby incorporated by reference to the extent pertinent. When present the total weight of such other active hydrogen-containing material should not exceed three times the weight of the phenolic resin and should preferably be less than that of the phenolic resin. In general, the polyisocyanate will be employed in a range of 10 to 500 weight percent of polyisocyanate based on the weight of the phenolic resin component.

Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80 percent by weight of the solution.

Although the solvent employed in combination with either the phenolic resin or the polyisocyanate or for both components does not enter, to any significant degree into the reaction between the isocyanate and the phenolic resin, it can affect the reaction. Thus the difference in the polarity between the polyisocyanate and the benzylic ether resins restricts the choice of solvents in which both components are compatible. Such compatibility is necessary to achieve complete reaction and curing of the resin compositions of the present invention. Additionally, the solvent, by reducing the viscosity of the binder, aids in the uniform distribution of the resin composition on a substrate or a particulate solid. Polar solvents of either the protic or aprotic type are good solvents for the phenolic resin, but have limited compatibility with the polyisocyanates. Aromatic solvents, although compatible with the polyisocyanates, are less compatible with the phenolic resins. It is therefore preferred to employ combinations of solvents and particularly combinations or aromatic and polar solvents. Suitable aromatic solvents are benzene, toluene, xylene, ethylbenzene, naphthalene, and mixtures thereof. Preferred aromatic solvents are mixed solvents that have an aromatic content of at least 90 percent and a boiling point range of 280° to 450° F. The polar solvents should not be extremely polar such as to become incompatible with the aromatic solvent. Suitable slightly polar solvents which are compatible with aromatic solvents include, in particular, ester and ether solvents. Suitable more polar but less costly solvents are generally those which have been classified in the art as coupling solvents and include furfural, furfuryl alcohol, cellosolve acetate, butyl cellosolve, butyl carbitol, diacetone alcohol, and "Texanol."

On combining the two components of the resin composition of the present invention, the resulting mixture is capable of cross-linking at room temperature to form a coating or a binder for particulate solids. In the foundry art, the binder or its components are admixed with sand or a similar foundry aggregate to form the foundry mix. Methods of distributing the binder or its components on the aggregate particles are well-known to those skilled in the art. The foundry mix can, optionally, contain other ingredients such as iron oxide, ground flax fibers, wood cereals, pitch, refractory flours, and the like.

A valuable additive to the binder compositions of the present invention is s silane having the general formula:

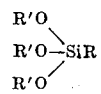

wherein R' is a hydrocarbon radical and preferably and alkyl radical of one to six carbon atoms and R is an alkyl radical, an alkoxy-substituted alkyl radical or an alkylamino-substituted alkyl radical in which the alkyl groups have from one to six carbon atoms. The aforesaid silane, when employed in concentrations of 0.1 and 2 percent based on the phenolic binder and hardener, improves the adhesion of the phenolic binder to the foundry aggregate particle.

Illustrative of the aggregates which may be bonded by the resin compositions of this invention are solid or hollow pellets or chips of taconite, aluminum, steel, carbon, other metals and glass, as well as cherry pits, corn cobs, pea gravel and walnut shells. The aggregate usually constitutes the major constituent and the binder portion normally constitutes a relatively minor amount, generally less than 10 percent and frequently within the range of 0.25 to about 5 percent, these figures being based on the weight of the aggregate. Although the aggregate employed is preferably dry, generally moisture of up to about 1 weight percent based on the weight of the aggregate can be tolerated. This is particularly true if the solvent employed is not water-miscible or if an excess of the polyisocyanate necessary for curing is employed, since such polyisocyanate will react with the water, thereby reducing the poisoning effect of the water on the metal ion.

Of particular interest is the binding of foundry aggregate, e.g., sand, with the resin compositions of this invention. In general the resin composition can be mixed with the foundry aggregate or each of the phenolic resin and polyisocyanate components mixed with the foundry aggregate in series or mixed with separate portions of foundry aggregate and the separate portions of foundry aggregate mixed together. The catalyst is usually added to either the phenolic resin or isocyanate component prior to mixing with the aggregate. The resulting foundry mix is then molded into the desired core or shape, whereupon it can be cured either slowly or rapidly on standing at room temperature.

The resin compositions of this invention have various other uses, such as protective or decorative coating and foundry core pastes. In these uses the resin compositions are used alone or with other materials, such as additional solvents, fillers or pigments.

The present invention is further illustrated by the following examples in which, unless otherwise indicated, all parts are by weight and all percentages are weight percentages.

EXAMPLE 1

Into a sealed kettle was charged 62.5 lbs. of phenol, 46.5 lbs. of paraformaldehyde, 0.95 lb. of a 24 percent solution of lead naphthenate in toluene and 4 lbs. of toluene. The vessel was sealed and heated to temperatures of 100° to 125° C for a period of 3 hours. During this heating period, the pressure was maintained at 2 to 4 psi, and steam release from the vessel as pressure increased. Some toluene distilled out with the steam. A total of 24 lbs. of water was removed. After 3 hours, a vacuum was pulled on the reaction mixture to remove all the toluene originally added. The resin was of the benzylic ether type as defined in formula III.

To parts of the resin solution was then added 1 percent 4,4'dipyridine. Fifty parts of the resin solution were admixed with 5,000 parts of Wedron silica sand until uniformley distributed. A liquid polyisocyanate hardner solution comprising 80 parts of a commercially available polyisocyanate "Mondur MR," a mixture of di- and triphenylmethane, di- and triisocyanate, and 20 parts of aromatic solvent (Hi-Sol 96C described hereinafter) was prepared. Fifty parts of the liquid polyisocyanate was added to the sand and resin mixture and uniformly distributed.

The resulting foundry mix was formed into standard AFS tensile test samples using the standard procedure. The tensile strength of the test bars were 20 psi after 2 hours, 110 psi after 4 hours, 200 psi after 24 hours and 220 psi after 16 hours at 125° F.

EXAMPLE 2

Using solely the resin of Example 1, the following resin and hardener solutions were made up:

Resin Solution:
- 52% Resin of Example 1
- 22% Cellosolve Acetate
- 25% Aromatic Solvent
- 1% 1,3-Di-4-pyridyl propane Hardener Solution:
- 80% Polyisocyanate
- 20% Aromatic Solvent The aromatic solvent employed in the formulation of the solutions was commercially available "Bronoco Hi-Sol 96" having a boiling point range of 315° to 360° F with a mixed aniline point of 57° F. The polyisocyanate was commercially available "Mondur MR." Fifty parts of each of the resin solution and the hardener were consecutively admixed with 5,000 parts of Wedron silica sand. The resulting foundry mix was then formed into standard AFS tensile test samples using the standard procedure.

The test samples were tested for compressive strength to establish at what time such samples could be removed from the mold. In general a 10 psi compressive strength is considered a minimum before removal of the sand form. The following results were obtained.

| | Compressive Strength in psi |
|---|---|
| After 7 minutes | 0.2 |
| After 9 minutes | 0.6 |
| After 13 minutes | 61 |
| After 16 minutes | 89 |
| After 18 minutes | 99 |

Thus it will be seen that curing in the mold could be reduced to about 10 minutes.

The test bars had tensile strengths of 40 psi after 30 minutes, 65 psi after 1 hour, 160 psi after 2 hours, 240 psi after 4 hours and 320 psi after about 16 hours at 125° F.

EXAMPLE 3

Resin and Hardener solutions were made up according to Example 2 except that 1 percent of 4-phenyl-propyl pyridine was employed instead of the dipyridyl propane and a foundry mix was prepared from these solutions as described in Example 2. The resulting foundry mix was found to have a bench life of 13 minutes and could be removed from the mold with sufficient strength for free-curing within 10.5 minutes. The tensile strength of the test bars after 4 hours was 220 psi and after 16 hours at 125° F 270 psi.

EXAMPLES 4–10

Resin solutions containing 52 parts of the resin of Example 1, 22 parts of cellosolve acetate, 25 parts of the aromatic solvent used in Example 2 and the indicated amounts (Table I) of 4-dipyridyl propane were made up.

Foundry mixes were made using 5,000 parts of Wedron silica sand, 50 parts of the resin solution and 50 parts of the hardener solution of Example 2. The bench life and the mold time for these mixes was established. Tensile bars made according to AFS procedures were air cured and their tensile strengths measured. The following results were obtained.

TABLE I

| Example | % Catalyst | Bench Life (min) | Mold Time Cure (min) | Tensile Strength (psi) Time 1 (hr.) | 2 | 4 | Overnight |
|---|---|---|---|---|---|---|---|
| 4 | 0.7 | 7 | 10 | 120 | 180 | 240 | 350 |
| 5 | 0.6 | 8 | 11.5 | 80 | 140 | 210 | 290 |
| 6 | 0.5 | 8.5 | 12 | 80 | 140 | 220 | 320 |
| 7 | 0.4 | 13 | 17 | 65 | 130 | 250 | 330 |
| 8 | 0.3 | 15 | 21 | 55 | 120 | 215 | 330 |
| 9 | 0.2 | 34 | 54 | 10 | 30 | 140 | 320 |
| 10 | 0.1 | 100 | — | 5 | 10 | 20 | 280 |

EXAMPLE 11

Into a sealed kettle was charged 75 lbs. phenol, 38 lbs. paraformaldehyde (91 percent), 0.1 lb. lead naphthenate and 0.05 lb. lead oxide. The vessel was sealed and heated to a temperature of 240°–255° F. Water began to distill over. After 1 hour, 12 lb. water was removed, and the percent free formaldehyde was less than 1 percent. Full vacuum was then applied for 10 minutes and the resin was cooled to 200° F and drained.

According to gel permeation chromatography, the average molecular weight was 150 to 200 and the formaldehyde to phenol mole ratio was 1.3 calculated from material balance. The resin was a mixture of the resins defined in formulas I, II and III.

A resin solution was prepared containing 52 percent by weight of the above resin, 22 percent cellosolve acetate, 25 percent of the aromatic solvent of Example 2 and 0.2 percent 1,3-Di-4-pyridyl propane. Fifty parts of the above resin solution and 50 parts of the hardener solution of Example 2 were consecutively admixed with 5,000 parts of Wedron silica sand. The resulting foundry mix was then formed into standard AFS tensile test samples using the standard procedure.

The test samples were tested for compressive strength to establish at what time such samples could be removed from the mold. In general, a 10 psi compressive strength is necessary before removal. The following results were obtained:

| | Compressive Strength (psi) |
|---|---|
| After 16 minutes | 0.5 |
| After 27 minutes | 1.4 |
| After 50 minutes | 60 |

EXAMPLE 12

56 parts of phenol, 58 parts of formalin (37 percent, 2 parts of NaOH (50 percent aqueous) are charged to a kettle and heated to about 60° C. After the reaction exotherm takes effect, cooling is applied to maintain temperature at about 77° C for about 2 hours as the reaction continues. Then 6 parts of paratoluene sulfonic acid solution (50 percent aqueous) is introduced, following which vacuum is continuously applied to dehydrate the reaction mass until the temperature rises to 88° C, whereupon the resultant resole resin is cooled and drained from the kettle.

A resin solution was prepared containing 59 percent by weight of the above resole resin, 50 percent cyclohexanone and 1 percent phenylpropyl pyridine. Fifty parts of the above solution and 50 parts of a solution containing 65 percent by weight of commercially available "NCO–120" polyisocyanate and 35 percent by weight of commercially available "HISOL 10," an aromatic solvent having a boiling range of 320° to 350° F and a mixed aniline point of 58° F, were consecutively admixed with 5,000 parts of Wedron silica sand. The resulting foundry mix was then formed into standard AFS tensile test bars using standard procedure: the bars were air cured and their tensile strengths measured. The following results were obtained:

Bench life was 7 minutes.
Mold time was 8.5 minutes.

| Cure Time (hours) | Tensile Strength (psi) |
|---|---|
| 1 | 160 |
| 2 | 200 |
| 4 | 240 |
| 24 | 170 |

I claim:
1. A resin composition comprising in admixture a phenolic resin component, a hardener component, and a curing catalyst wherein said resin component is (a) an organic solvent soluble benzylic ether resin which contains benzylic ether group and which comprises a condensation polymer of a phenol having the general formula:

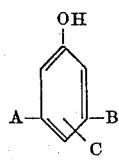

wherein A, B and C are hydrogen, hydrocarbon radicals, oxyhydrocarbon radicals or halogen, condensed with an aldehyde having the general formula R'CHO wherein R' is hydrogen or a hydrocarbon radical of one to eight carbon atoms in the presence of catalytic concentrations of a metal ion, or (b) a methylol-terminated phenolic resin which comprises a resole resin which is organic solvent soluble; said hardener component is a liquid polyisocyanate containing at least two isocyanate groups; and is present in an amount equal to 10 to 500 weight percent based on the weight of the resin and said curing agent is a base having a $pK_b$ value in the range of about 7 to about 11 and is present in an amount equal to 0.01 to 10.0 weight percent based on the weight of the resin.

2. The resin composition of claim 1, wherein the resin component is a benzylic ether resin which contains a unit of the formula:

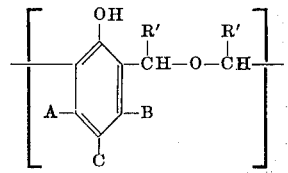

wherein A, B and C are hydrogen, hydrocarbon radicals, oxyhydrocarbon radicals, or halogen, and wherein R' is a hydrogen or a hydrocarbon radical of one to eight carbon atoms.

3. The resin composition of claim 2, wherein the aldehyde is formaldehyde.

4. The resin composition of claim 2, wherein the aldehyde is formaldehyde, and A and B are hydrogen, and C is a hydrocarbon radical.

5. The resin composition of claim 2, wherein the aldehyde is formaldehyde and A, B and C are hydrogen.

6. The resin composition of claim 1, wherein the resin component is a benzylic ether resin which is obtained by polymerizing the phenol and the aldehyde in the liquid phase in the substantial absence of water at temperatures below 130° C.

7. The resin composition of claim 1, wherein the resin component is a benzylic ether resin which has the general formula:

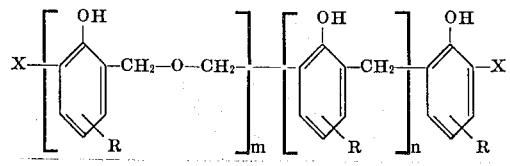

wherein R is hydrogen or a phenolic substutuent meta to the hydroxyl group of the phenol, m and n are numbers the sum of which is at least 2, X is an end-group from the group consisting of hydrogen and methylol, and wherein m is at least 1 and the sum of m and the number of methylol end-groups is at least 2.

8. The resin composition of claim 7, wherein R is hydrogen.

9. The resin composition of claim 1, wherein the polyisocyanate is an aromatic polyisocyanate.

10. The resin composition of claim 9, wherein the aromatic polyisocyanate is diphenylmethane diisocyanate.

11. The resin composition of claim 7, wherein the polyisocyanate is an aromatic polyisocyanate.

12. The resin composition of claim 1, wherein the base is a nitrogen compound.

13. The resin composition of claim 1, wherein the base is a heterocyclic nitrogen compound.

14. The resin composition of claim 1, wherein the base is pyridine or a derivative of pyridine.

15. The resin composition of claim 1, wherein the base is a 4-alkyl pyridine wherein the alkyl group has from one to four carbon atoms, isoquinoline, an aryl-pyridine, acridine, 2-methoxy pyridine, 4,4-dipyridine or phenylpropyl pyridine.

16. A foundry mix containing sand as the major consitutent and a binding amount of up to 10 percent based on the weight of sand of the resin composition of claim 1.

17. A foundry mix containing sand as the major consitutent and a binding amount of up to 10 percent based on the weight of sand of the resin composition of claim 7.

* * * * *